(12) United States Patent
Asquith

(10) Patent No.: US 8,353,610 B2
(45) Date of Patent: Jan. 15, 2013

(54) VEHICLE HEADLAMPS WITH FLASH DURATION LIMITING

(75) Inventor: Julian Peter Asquith, Oxford (GB)

(73) Assignee: Sandra McNiell Asquith, Oxford (GB)

( * ) Notice: Subject to any disclaimer, the term of this patent is extended or adjusted under 35 U.S.C. 154(b) by 277 days.

(21) Appl. No.: 12/816,147

(22) Filed: Jun. 15, 2010

(65) Prior Publication Data

US 2011/0210665 A1   Sep. 1, 2011

(30) Foreign Application Priority Data

Feb. 26, 2010   (GB) .................................. 1003239.9
Jun. 8, 2010    (GB) .................................. 1009518.0

(51) Int. Cl.
*B60Q 1/06* (2006.01)
*B60Q 1/08* (2006.01)

(52) U.S. Cl. ........ 362/464; 362/465; 362/508; 362/523; 315/82; 315/83

(58) Field of Classification Search ................. 362/464, 362/465, 466, 508, 523; 315/82, 83
See application file for complete search history.

(56) References Cited

U.S. PATENT DOCUMENTS

| | | | | |
|---|---|---|---|---|
| 1,774,101 A * | 8/1930 | Lorimer | ......................... | 315/82 |
| 2,560,748 A * | 7/1951 | Silva | ............................... | 315/83 |
| 2,655,642 A * | 10/1953 | Ayres et al. | ..................... | 315/83 |
| 3,305,695 A * | 2/1967 | Late | ................................ | 315/82 |
| 3,376,467 A * | 4/1968 | Ree | ................................ | 315/82 |
| 3,383,552 A * | 5/1968 | Brock | ............................ | 315/83 |
| 3,648,101 A * | 3/1972 | Suzuki | .......................... | 315/82 |
| 3,825,798 A | 7/1974 | Teich | | |
| 4,208,615 A * | 6/1980 | Jones et al. | ..................... | 315/83 |
| 4,648,005 A * | 3/1987 | Brassington | ................... | 315/82 |
| 4,667,129 A * | 5/1987 | Papillon | ......................... | 315/82 |
| 4,692,736 A | 9/1987 | Crisci | | |
| 5,389,913 A | 2/1995 | Boser et al. | | |
| 6,049,171 A * | 4/2000 | Stam et al. | ...................... | 315/82 |
| 6,281,632 B1 * | 8/2001 | Stam et al. | ...................... | 315/82 |

FOREIGN PATENT DOCUMENTS

| | | |
|---|---|---|
| CA | 2139892 | 9/1996 |
| GB | 1329948 | 9/1973 |
| GB | 2332741 | 6/1999 |
| GB | 2448181 | 10/2008 |

* cited by examiner

*Primary Examiner* — Ismael Negron

(57) ABSTRACT

A vehicle headlamp system including at least one headlamp switchable between at least a high beam mode and a low beam mode by a biased actuator movable by a driver of the vehicle, a headlamp arranged to emit a flash when the biased actuator is moved to a temporary-on position, and means for limiting the maximum duration of the flash to less than 2 seconds.

16 Claims, 3 Drawing Sheets

VEHICLE HEADLAMPS WITH FLASH DURATION LIMITING

FIELD OF THE INVENTION

The invention relates to safety improvements to headlamps.

BACKGROUND OF THE INVENTION

In this specification the term "headlamp" or "headlamps" refers to the main light or lights (usually two) commonly fitted at the front of a car or other road vehicle. These commonly provide white light, but sometimes headlamps are tinted yellow. The term "headlight" is sometimes used interchangeably with headlamp, but more correctly the term "headlight" refers to the beam of light produced by a headlamp.

In this specification a reference to a road vehicle includes a reference to any road vehicle, including but not limited to cars, vans, buses, lorries and motorcycles, and a reference to a driver includes any driver including the rider of a motorcycle. References to road users include all road users including pedestrians.

Modern headlamps are electrically operated, and usually positioned in pairs, one or two on each side of the front of a vehicle. Most cars and other road vehicles are now fitted with headlamps which can be switched by the driver between a "high beam" (called a "main beam" or "full beam" or "driving beam" in some countries) and a "low beam" (sometimes called a "dipped beam). The high beam is brighter than the low beam, and the low beam is also commonly tilted down towards the road more than the high beam. The high beam is intended to illuminate a greater distance than the low beam, but the high beam is also more likely to dazzle oncoming road users.

The headlamps of many cars and other road vehicles are now operated using a stalk switch, hereinafter referred to as a "headlamp stalk", which may be in the form of a pivoted stick or arm mounted just behind or below the steering wheel, for example mounted on the steering column. The headlamp stalk, which commonly also controls the turning indicators, allows the driver to select the main beam or low beam. The headlamp stalk may also be used to flash the headlamps.

The circumstances under which it is permitted to flash headlamps vary by jurisdiction. Examples of headlamp flashing which are nearly always permitted include warning another road user that their lights are not illuminated, or simply alerting another road user to your presence. There are other uses of headlamp flashing which occur frequently, including indicating that another road user may proceed, or thanking another road user for some action. This application is concerned with increasing the safety of headlamp flashes where such flashes occur for whatever reason.

When headlamps are flashed at another road user, particularly at night, the road user may become momentarily dazzled by the flashed high beam, particularly if the cars are approaching each other in opposite directions. The U.S. National Highway Traffic Safety Administration states that nearly half of all traffic-related fatalities occur in the dark, despite only 25% of traffic traveling during darkness.

In addition, a road user may misinterpret a headlamp flash as a rebuke, in the same way that the sounding of a horn may be misinterpreted. There is thus a need for a solution which addresses these issues.

SUMMARY OF THE INVENTION

The statements of invention below are of broader scope than the attached claims in order to allow the later filing of divisional applications covering different aspects of the invention. The content of this disclosure should therefore not be construed as being limited by the attached claims.

In its broadest form the invention provides a vehicle headlamp system comprising a headlamp arranged to emit a safety flash as defined herein. The safety flash may be initiated by a driver of the vehicle in any suitable manner, such as for example by using a biased actuator or a touch sensitive panel.

The invention also provides a headlamp system for a vehicle comprising:
at least one headlamp which is switchable between at least a high beam mode and a low beam mode, in which the headlamp emits a high beam and a low beam respectively, and wherein said high beam is of higher intensity than said low beam;
a biased actuator which is movable by a driver of the vehicle between a temporary-on position and an off position, and which is biased from said temporary-on position to said off position; and
a headlamp which is arranged to emit a safety flash when said biased actuator is moved to said temporary-on position.

Preferably said safety flash comprises only a single flash.

The headlamp system may comprise a biasing device biasing said biased actuator from said temporary-on position to said off position, so that said biased actuator moves to said off position when the actuator is released by said driver.

The headlamp arranged to emit a safety flash and said at least one headlamp switchable between high and low beam modes may be the same headlamp.

Preferably said safety flash is of automatically limited duration.

Preferably said safety flash has an overall duration which is automatically limited to a value which is less than any one of: 2 seconds, 1.5 seconds, 1 second, 0.5 seconds, 015 seconds or 0.1 seconds. Most preferably said safety flash has an overall duration which is automatically limited to a value which is less than 1 second, such as 0.25 seconds for example.

In one embodiment said system further comprises a duration control which when adjusted by a driver varies said automatically limited duration of the safety flash.

In one embodiment said safety flash is of lower intensity than said high beam.

Said safety flash may be of higher intensity than said low beam.

In one embodiment said headlamp system further comprises a light sensitive device responsive to the ambient light level, and a control device for controlling, in response to a signal from said light sensitive device, the duration of the safety flash to be shorter, or the intensity of said safety flash to be lower, for lower ambient light levels than for higher ambient light levels.

In a further embodiment the duration of the safety flash is shorter, or the intensity of said safety flash is lower, if said at least one headlamp is in said low beam mode at the time said biased actuator is moved to said temporary-on position, than if said at least one headlamp is off at the time said biased actuator is moved to said temporary-on position.

The headlamp system may further comprise an intensity control which when adjusted by a driver varies the intensity of the safety flash.

Said biased actuator may be a button, which may be referred to hereinafter as a biased actuator button.

Also provided is a headlamp system wherein said biased actuator is a headlamp stalk, and wherein said headlamp stalk has an off position in which said high beam is off, and a temporary-on position, and wherein said headlamp stalk is provided with a stalk biasing device which biases said stalk from said temporary-on position to said off position, so that when in said temporary-on position and released by a driver the stalk automatically returns to said off position.

In one embodiment said headlamp stalk has at least two possible modes of operation when moved to said temporary-on position, said two modes being:
 a) a first mode in which said high beam is on for as long as said headlamp stalk is in said temporary-on position; and
 b) a second mode in which movement of said headlamp stalk to said temporary-on position produces said safety flash.

Also provided is a headlamp system which further comprises a stalk mode button which can be moved between a first and second position, and is biased from said second position to said first position, and wherein said system is arranged so that when the stalk mode button is held in said second position said headlamp stalk operates in said second mode, and when said stalk mode button is in said first position said headlamp stalk operates in said first mode.

Said stalk mode button may be mounted on said headlamp stalk.

Also provided is a headlamp system which comprises a headlamp stalk for switching said at least one headlamp between said high and low beam modes, and wherein said biased actuator button is mounted on said headlamp stalk.

In this case said headlamp stalk may have a temporary-on position in which said at least one headlamp emits said high beam for as long as the headlamp stalk remains in its temporary-on position, and wherein a first force applied by a driver to said biased actuator button is sufficient to move said biased actuator button from its off position to its temporary-on position, thus initiating said safety flash, but not sufficient to move said headlamp stalk to its temporary-on position, and wherein a second force of greater magnitude than said first force applied by a driver in the same direction as said first force is sufficient to move said headlamp stalk to its temporary-on position, thus initiating a high beam flash.

Preferably movement of said headlamp stalk to its temporary-on position immediately initiates a high beam flash, regardless of the position of said biased actuator button.

If said biased actuator is a headlamp stalk, said headlamp stalk may have first and second temporary-on positions arranged so that movement of the headlamp stalk to said first temporary-on position produces said safety flash, and movement of said headlamp stalk to said second temporary-on position produces a flash of said high beam.

In this case the headlamp system may be arranged so that a first force applied by a driver to said headlamp stalk is sufficient to move said headlamp stalk to its first temporary-on position, thus initiating said safety flash, but not sufficient to move said headlamp stalk to its second temporary-on position, and a second force of greater magnitude than said first force applied by a driver in the same direction as said first force is sufficient to move said headlamp stalk to its second temporary-on position, thus initiating a high beam flash.

The invention also provides a method of controlling the headlamps of a vehicle, said method including:
 providing a headlamp system comprising a biased actuator as described above;
 moving said biased actuator to its temporary-on position; and
 causing headlamps of the vehicle to emit a safety flash in response to movement of said biased actuator to said temporary-on position.

The invention also provides a method of producing a safety flash of at least one headlamp of a vehicle having a driver, said method including:
 determining a time period of limited duration;
 initiating a safety flash of said at least on headlamp in response to an action of the driver; and
 automatically ending said safety flash at the end of said limited duration, if the safety flash has not ended earlier.

Preferably said limited duration is less than any one of: 2 seconds, 1.5 seconds, 1 second, 0.5 seconds, 0.25 seconds or 0.1 seconds. Most preferably said limited duration is less than 1 second.

The method may further comprise:
 providing a biased actuator having a temporary-on position and an off position, and which is biased from said temporary-on position towards said off position;
 initiating said safety flash in response to movement of said biased actuator to said temporary-on position.

The method may further comprise:
 ending said safety flash before the end of said limited duration if said biased actuator moves to said off position before the end of said limited duration; or
 automatically ending said safety flash at the end of said limited duration regardless of whether said biased actuator moves to said off position before the end of said limited duration.

The headlamp system of any aspect or embodiment of the invention may comprise any or all of the optional features of any of the other aspect or embodiment of the invention.

DESCRIPTION OF PREFERRED EMBODIMENTS

Figure 1:
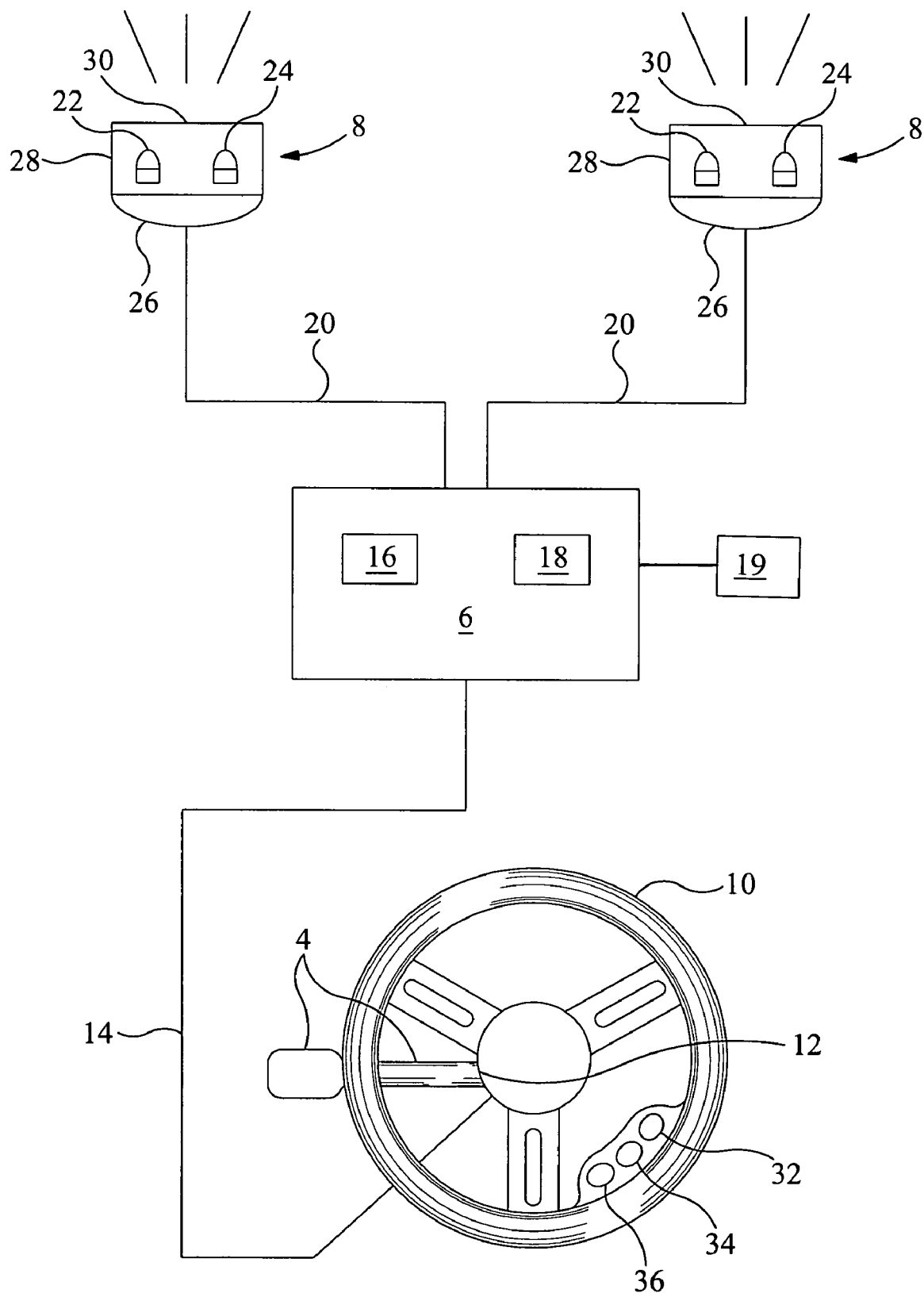
FIG. 1 shows components of a headlamp system for use in various embodiments of the invention.

FIG. 1 will be used to describe a number of different embodiments. FIG. 1 shows a headlamp system comprising a headlamp stalk 4 and control unit 6, for controlling two headlamps 8 of a vehicle. The headlamp stalk 4 is mounted immediately behind a steering wheel 10, and the base 12 of the headlamp stalk 4 is pivotally mounted to the steering column (not shown) of the vehicle, so as to allow the stalk 4 to be moved towards or away from the driver, as will be described below.

Movement of the headlamp stalk 4 sends electrical signals to the control unit 6 via an electrical wire 14. The control unit 6 comprises a microprocessor 16 and memory 18, and controls switching of the headlamps 8 via electrical connections 20, or by any other means. The control unit 6 is powered by the vehicle battery (not shown).

The headlamps 8 are controllable, by means of the control unit 6, between high beam and low beam modes (or states), which have high and low light outputs respectively as described above. The low beam mode is intended to illuminate the road ahead and show the presence of the vehicle without dazzling other road users. The high beam mode is intended to illuminate a greater distance of the road ahead, but should generally not be used when approaching an oncoming vehicle. If necessary different bulbs 22, 24 within the headlamps 8 may be used for the high and low beam modes, and different high and low beam circuits may be used for each of the bulbs 22, 24. Alternatively a single bulb can be used in each headlamp 8, which switches between different light outputs. Each headlamp 8 is a unit which includes one or more bulbs 22, 24, a reflector 26 behind each bulb 22, 24, a casing 28 and a lens 30.

The headlamp stalk 4 in conventional systems has three positions: an off position in which the high beam is off; a stable, "latched-on" position in which the high beam remains on, and an unstable or "temporary-on" position in which the high beam remains on only as long as the headlamp stalk 4 is held by the driver in its temporary-on position. Starting from the off position, which is the central position of the three positions, the headlamp stalk 4 is pushed away from the driver into the latched-on position, or pulled towards the driver into the temporary-on position.

Once moved to the latched-on position, the headlamp stalk 4 clicks into position and remains in the latched-on position until moved by the driver back into the off position. However, the headlamp stalk 4 is biased, for example under the action of a spring (not shown), to return automatically from the temporary-on position to the off position, once released by the driver.

The temporary-on position is intended to operate the high beam temporarily or momentarily. The temporary-on position of the headlamp stalk 4 may therefore be used by the driver to flash the headlamps 8.

The features of the headlamp system described so far are all known features.

Using the temporary-on position of headlamp stalk 4 to flash the headlamps 8 provides the average driver with very little control over the duration of such a flash, and certainly no control over the intensity of the flash. Achieving a flash of short duration provides a number of benefits. The flash is less likely to dazzle another road user, but there are other potential benefits. For example, a shorter flash is less likely to be interpreted by another road user either as a rebuke or as a signal demanding a sudden (and hence less safe) response. Ideally the flash should be no more than a brief pulse of light, which is just enough to send a gentle signal without dazzling, intimidating or urging a sudden response.

Achieving such a brief pulse of light using the temporary-on position of the headlamp stalk 4 presents the average driver with a number of difficulties. The duration of the flash is totally dependent on the dexterity of the fingers of one hand of the driver. In the case of some vehicles, quickly pulling the headlamp stalk and releasing it causes the headlamp stalk to overshoot the off position and continue into the latched-on position, thus achieving the opposite result to that intended.

Furthermore many drivers may not be aware of the benefits of a brief flash and may not be aware when they are dazzling another driver.

We next describe various embodiments which produce a "safety flash" or "controlled flash" of the headlamps 8 (or of another headlamp or pair of headlamps on the vehicle). There are three things to consider:

1. The features of a "safety flash";
2. Preferred embodiments for producing a safety flash; and
3. Options after a safety flash.

We consider each of these in turn.

1. The Features of a Safety Flash

In this specification, and the embodiments described herein, a "safety flash" is:

a) a brief flash of the headlamp(s) of a vehicle, wherein the flash is of automatically limited duration, and wherein the limit of said duration is preferably of less than 2, 1.5, 1, 0.5, 0.25 or 0.1 seconds; or b) a flash of the headlamp(s) of the vehicle wherein the flash is of lower intensity than the high beam of the headlamp(s); or c) a combination of (a) and (b), ie a reduced intensity flash of automatically limited duration.

These features effectively define two different types of safety flash, type (a) (ie limited duration) and type (b) (ie reduced intensity), although the features of each may be combined in any way to produce a safety flash which is both type (a) and type (b) (ie limited duration and reduced intensity).

A reduced intensity flash of type (b) may be automatically limited in duration, as for type (a), but is not necessarily so limited. A safety flash is therefore of potentially any duration.

In any embodiment the safety flash may be automatically produced (for example by the control unit 6 below) in the form of multiple flashes, ie a number of flashes (which we refer to as sub-flashes) in quick succession. In certain circumstances this may be more effective at attracting the attention of another road user. Each of the sub-flashes may be of limited duration and/or reduced intensity in exactly the same way as the safety flashes described above. In the case of a multiple flash safety flash (ie a safety flash comprising multiple sub-flashes) the automatically limited duration (referred to above) is the overall duration of the safety flash, rather than the duration of each sub-flash. Once the safety flash has ended, by the end of the automatically limited duration, no further safety flash or sub-flash is produced until the biased actuator (described in the embodiments below) is again moved to its temporary-on position. Preferably a safety flash comprises only a single flash, in which case the duration of the flash and the overall duration of the safety flash are the same thing. Another preferred embodiment is a safety flash in the form of a double flash, which comprises only two sub-flashes.

A safety flash may use the same or different bulbs as used for the high beam mode. Indeed a safety flash need not necessarily use the same headlamps as used for the high beam mode, and may use different "headlamps", that is other forward facing lights on the vehicle may be used. Therefore it should be understood throughout this specification that a safety flash of headlamps includes a safety flash of any headlamps on the vehicle. However preferably the headlamps which are arranged to emit the safety flash are the same headlamps which are arranged to provide the high and low beams. If there are two headlamps (or more), preferably both (or all) headlamps are arranged to emit the safety flash at the same time.

The embodiments described below use various different biased actuators, each having a temporary-on position (described below), to produce the safety flash. (Examples of such biased actuators are the button 32 in the first embodiment, the headlight stalk 4 or 40 in embodiments two to four, button 42 in embodiment five, and stalk 40 in embodiment six.) Looking at the features of the safety flash in paragraphs a) and b) above, these two features have in common the fact that if the biased actuator is held in its temporary-on position for a relatively long period then the light emitted by the headlamps as a result of the safety flash is less than would be emitted by the high beam if the high beam were on for that period. A relatively long period in this context is a period which is longer than a limited duration safety flash, so a long period could be 2 seconds, but could be a shorter period if the safety flash duration is shorter.

More precisely we could say that the light emitted by a safety flash in a forward direction is less than would be emitted by the high beam in the same direction. More precisely still, we could say that the light emitted by a safety flash in the average direction of other road users in front of the vehicle is less than would be emitted by the high beam in the same direction. This is because headlamps are forward facing lights on a vehicle, and an aim of the embodiments is to produce a safety flash which is less likely to dazzle or intimidate other road users. We are therefore principally concerned with light directed at other road users in front of the vehicle headlamps.

In this specification where we refer to the brightness or intensity of a headlamp we are referring to the total light output of the headlamp per unit time. Effectively this is the power output of the headlamp.

For a safety flash of type (a), the automatically limited duration of the safety flash means that the safety flash either (i) continues for a period of time up to some maximum time period, or (ii) continues for a fixed time period.

In the first case (ie case (i)—maximum time period), the maximum time period effectively sets the limit of the limited duration of the safety flash, but the safety flash can end before the end of the maximum time period if the biased actuator is returned to its off position before the end of the maximum time period. In this case it is possible for a user to produce a safety flash of shorter duration than the maximum time period (ie the limit of the limited duration) by very quickly moving the biased actuator to its temporary-on position and back to its off position. In the second case (ie case (ii)—fixed time period) the safety flash is of fixed duration, regardless of whether the biased actuator is returned to its off position before the end of the safety flash.

For both cases (i) and (ii) the important thing is that a safety flash of type (a) cannot be longer than the automatically limited duration, which defines a limit to the duration. This limit is preferably less than 1 second (ie in the range 0 to 1 second). For briefer flashes the limit may be less than 0.5 seconds, 0.25 seconds or 0.1 seconds. The limit can be predetermined but is not necessarily so, as is discussed below.

In any embodiment either the duration of the safety flash, the brightness of the safety flash, or both, can depend on detection of the ambient light level, or on whether the low beam of the vehicle headlamps is on when the safety flash is initiated. A light sensor 19 on the vehicle may detect the ambient light level and send a signal, for example to the control unit 6 described below, which in turn shortens the duration of the safety flash, reduces the intensity of the safety flash, or both, in darkness or low light conditions, thus avoiding dazzling other road users at night. Alternatively the duration and/or brightness of the safety flash may be reduced (for example by the control unit 6 described below) if the low beam of the vehicle headlamps is already switched on at the time the safety flash is initiated, it being assumed that this corresponds with darkness or low light conditions. If the low beam is off at the time the safety flash is initiated then it may be assumed to be daytime, in which case the safety flash may be of longer duration and/or more bright, perhaps as bright as the high beam brightness.

Where the duration of the safety flash depends on the ambient light level or other factors, the duration of the safety flash may be calculated (for example by microprocessor 16 of control unit 6) at any time, including before or after initiation of the safety flash, or at the moment of initiation. The duration of the safety flash is therefore not necessarily predetermined before the start of the safety flash. However the limit of the duration of the safety flash is predetermined in the sense that it does not depend on how long the biased actuator is held in its temporary-on position. The duration of the safety flash may sometimes depend on how long the biased actuator is held in its temporary-on position (as in case (i) using a maximum time period discussed above), but the limit does not.

The light of the safety flash is preferably light which would be perceived to be predominantly white or yellow by the majority of average people. The light may also be light which is within the colour boundaries of a headlamp standard, such as UNECE Vehicle Regulation 112. The safety flash is not necessarily white, and embodiments are possible in which the safety flash is any colour.

2. Preferred Embodiments for Producing a Safety Flash

We consider six embodiments below.

In a first embodiment a button 32 on the steering wheel 10 may be used to send a signal to the control unit 6 to cause the control unit 6 to produce a safety flash of the headlamps 8. The button 32 is biased by a spring (not shown) so that after being pressed down (into a temporary-on position) by a user it automatically rises (to an off position) when released by a user.

If the safety flash is of type (a) above, then as soon as the button 32 is pressed down to its temporary-on position the headlamps emit a brief pulse of the light (of high beam intensity or lower intensity) lasting only say 0.25 seconds, regardless of how long the button 32 is held down before being released. The pulse is of automatically limited duration, so that if the button 32 is held down for longer than 0.25 seconds then the total amount of light emitted by the headlamps is less than would have been emitted if the high beam were on for that longer period, thus reducing the chances of dazzling another road user.

If the safety flash is of type (b), a flash may be emitted from the headlamps 8 for as long as the button 32 is held down by a user (or for an automatically limited duration if the flash is also of type (a)), but the flash is of lower brightness/intensity than the high beam.

It will be appreciated that similar embodiments are possible in which, instead of button 32, any control or actuator is provided to allow the driver to produce such a safety flash. The actuator can take any form, including a button, lever or touch sensitive panel available to the driver, for example on the dash board or steering wheel. Most notably, however, the actuator can be the headlamp stalk 4 itself, and this takes us on to the next embodiment.

In a second embodiment, the headlamp system of FIG. 1 is modified so that movement of headlamp stalk 4 to its temporary-on position (which position is described above in relation to a conventional headlamp stalk) automatically produces a safety flash of the headlamps 8 (again by sending a signal to control unit 6). For a safety flash of type (a), when the driver moves the headlamp stalk 4 to its temporary-on position the headlamps 8 may be switched to their high beam mode and then automatically switched back to their previous state (ie back to low beam mode or off) after a period of say 0.25 seconds, regardless of whether the driver continues to hold the headlamp stalk 4 in the temporary-on position for longer than 0.25 seconds. The period may be longer or shorter, as described above.

Whilst the second embodiment has certain advantage it is possible that some drivers may feel they had lost some functionality of the headlamp stalk 4. One solution is to provide an optional override switch 34 which can be used to switch the controlled flash functionality on or off. The override switch 34 can be latched in on and off positions. When override switch 34 is off, the headlamp stalk 4 behaves in the normal manner with no controlled flash functionality. In this case, moving the stalk 4 to its temporary-on position simply switches the headlamps 8 to the high beam mode. With the override switch 34 switched on the headlamp stalk 4 again operates to provide safety flashes. It should be understood that an override switch, such as switch 34, can optionally be provided in any of the embodiments described herein in order to switch the safety flash functionality on or off.

A third embodiment is now described which has the advantage of allowing a driver to use the headlamp stalk 4 either in the normal manner (in which movement to the temporary-on position simply switches on the high beam), or in a modified manner which produces a safety flash.

In the third embodiment a button 36 is provided on the steering wheel 10, or in any other suitable location, and whilst the button 36 is held down by a user the behaviour of the headlamp stalk is modified so that movement of the stalk 4 to the temporary-on position produces a safety flash. The button 36 is biased, from a depressed on position towards a raised off position, in the same way as button 32 described above.

There are several advantages to the third embodiment. Firstly none of the normal functionality of the headlamp stalk 4 is lost. It can be used entirely in the conventional manner, if desired. Secondly, use of the headlamp stalk 4 to produce a safety flash requires a very deliberate action on the part of the driver. The driver must hold down button 36 at the same time. However, in the third embodiment the need to use both hands to produce a safety flash may be undesirable for some drivers and this takes us on to the fourth and fifth embodiments.

Figure 2:
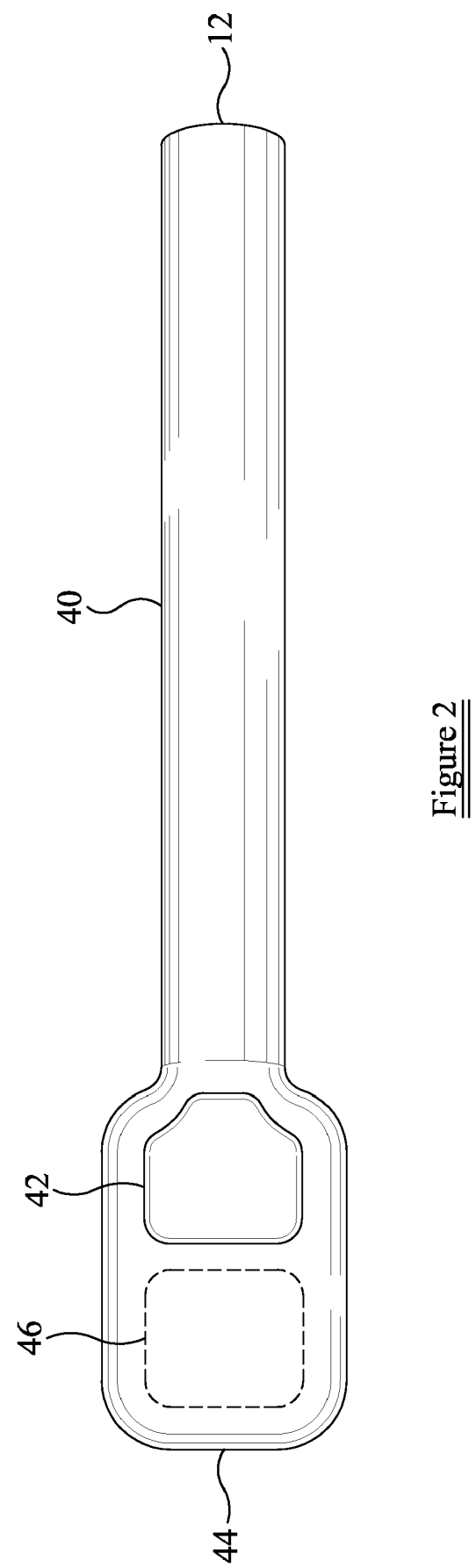
FIG. 2 shows is a rear view of an improved headlamp stalk for use in various embodiments of the invention.

The fourth and fifth embodiments both use a modified headlamp stalk 40 shown in FIG. 2. The headlamp stalk 40 is conventional except for the addition of a safety flash button 42. The button 42 is biased, for example by a spring (not shown), from a depressed temporary-on position towards a raised off position. The button 42 does not latch in its temporary-on position. The button 42 may be pressed down by a user into its temporary-on position, and once released it rises back up to its off position. The button 42 is located on the rear of headlamp stalk 40, that is on the opposite side of the headlamp stalk 40 to the driver, so it is possible for the driver to use a single finger to both press down button 42 and move (ie pull) headlamp stalk 40 to the temporary-on position in a single movement. The force required to press down button 42 is less that the force required to move the headlamp stalk 40 to its temporary-on position. If button 42 is pressed the button first moves to its temporary-on position, and then if greater force is applied the headlamp stalk 40 moves to its temporary-on position. The button 42 could be made more prominent, so that it can be easily detected by a driver's finger, for example even through gloves. The button 42 can be raised so that it protrudes from the headlamp stalk 40, and/or can have a ridged surface. Alternatively the button 42 could be replaced by a touch sensitive panel. In the fourth and fifth embodiments button 42 has different functions, as will now be described.

In the fourth embodiment the safety flash button 42 has the same functionality as button 36 in the third embodiment. When the button 42 is in its off position (ie not pressed) the headlamp stalk 40 behaves in a conventional manner, in which movement of the headlamp stalk 40 to its temporary-on position simply switches on the high beam for as long as the headlamp stalk 40 is held in its temporary-on position. When button 42 is in its temporary-on position (ie pressed down) the behaviour of the stalk 40 is modified so that movement of the headlamp stalk 40 to its temporary-on position produces a safety flash, for example a flash of limited duration or reduced intensity or both. In the fourth embodiment pressing button 42 alone is not sufficient to produce a flash (of any kind). In order to produce a flash of any kind, ie a conventional flash or a safety flash, it is still necessary for the driver to pull the headlamp stalk 40 into its temporary-on position.

In the fifth embodiment the function of button 42 is changed, so that when button 42 is pressed into its temporary-on position a safety flash is initiated. In this embodiment movement of the headlamp stalk 40 to its temporary-on position always produces a conventional full beam headlamp flash, regardless of the position of button 42. If the driver reaches out and gently presses button 42 a safety flash is produced. If the driver presses harder so as to move the headlamp stalk 40 to its temporary-on position, then a normal full beam headlamp flash is produced (for as long as the headlamp stalk 40 is held in its temporary-on position) regardless of whether button 42 is also pressed or not. If the driver presses button 42 gently first, and then presses harder to move the headlamp stalk to its temporary-on position, then a safety flash is produced followed by a conventional full beam headlamp flash. In this way the full functionality of the headlamp stalk 40 is retained. The headlamp stalk 40 can still be used entirely conventionally. In addition, button 42 provides the ability to produce safety flashes. In an emergency or panic situation, if a driver were to just pull the headlamp stalk 40 back to its temporary-on position without thinking about button 42, then the headlamp stalk 40 would behave entirely conventionally, and a full beam flash would still be produced. In other situations, where a driver wishes to give a gentle safety flash, then the driver can achieve this by a press of button 42 without moving the headlamp stalk 40.

Variations of the fifth embodiment are possible. Movement of the headlamp stalk 40 to its temporary-on position does not have to produce a conventional full beam flash in all cases. Instead, movement of the headlamp stalk 40 to its temporary-on position could also produce a safety flash, having different characteristics from the safety flash produced by pushing button 42. For example, movement of headlamp stalk 40 to its temporary-on position could normally produce a conventional high beam flash, but could produce a flash of reduced intensity if low ambient light levels were detected. Such variations are not explored here because it is felt to be desirable for the headlamp stalk 40 to behave in a conventional way when moved to its temporary-on position, thus retaining all conventional functionality of headlamp stalk 40, in addition to the features provided by button 42.

In both the fourth and fifth embodiments the position of the button 42 is important. The stalk 40 has a base 12 at which it is pivotally mounted in use, as described for stalk 4 in FIG. 1. The base 12 may be regarded as the proximal end of the stalk 40, and the other end may be regarded as the distal end 44. The button 42 is positioned near the distal end 44 of the stalk 40, but is positioned sufficiently far away from the distal end 44 to leave an area 46 (represented schematically using dotted lines in FIG. 2), between button 42 and distal end 44, which can be used by a driver to move (ie pull) the stalk 40 to its temporary-on position without pressing button 42.

The size of area 46 and the area of the safety flash button 42 should preferably be similar, because either may be used by a driver. However, for certain vehicles or types of driving one may be more important, or more commonly used, than the other. In such cases it may be desirable to change the ratio of the areas. For example, if it is envisaged that nearly all flashes should be safety flashes then the area of the button 42 can be made larger relative to the area 46, or vice versa in cases where it is envisaged that most flashes will not be safety flashes. In general one of the areas will not be more than twice the area of the other, although embodiments are of course possible having any ratio.

In both the fourth and fifth embodiments the driver can operate the headlamp stalk 40 as a conventional headlamp stalk by pressing on area 46 to move the headlamp stalk 40 to its temporary-on position. Alternatively, the driver need only stretch his/her finger a little further to reach the safety flash button 42 to effect a safety flash. Thus in both the fourth and fifth embodiments the safety flash button 42 achieves the following: a) the headlamp stalk 40 can be used either conventionally or to produce a safety flash, and b) if desired, a safety flash can be produced using a single finger, being the same finger which is habitually used to produce a conventional flash.

The sixth embodiment is described with reference to FIG. 1, and uses a conventional looking headlamp stalk, such as the headlamp stalk 4 shown in FIG. 1. In this embodiment the headlamp stalk 4 does not have the button 42 shown in FIG. 2. Instead the headlamp stalk 4 simply has two temporary-on positions. If the headlamp stalk 4 is pulled gently it moves to a first temporary-on position, which initiates a safety flash, and if the headlamp stalk 4 is pulled more firmly it moves to a second temporary-on position, which initiates a conventional high beam flash in the normal way. The operation of the sixth embodiment is therefore very similar to the fifth embodiment, in that a gentle press of the headlamp stalk produces a safety flash, and a harder press produces a conventional flash. In the sixth embodiment it is not possible to produce a conventional high beam flash without first moving the headlamp stalk through its first temporary-on position which initiates a safety flash. However, the sixth embodiment is arranged so that the conventional high beam flash is produced immediately the headlamp stalk 4 reaches its second temporary-on position, regardless of whether the safety flash has finished (if it is of type (a)). Therefore if the headlamp stalk 4 is moved quickly from its off position to its second temporary-on position the safety flash is imperceptible. The conventional full beam functionality of the headlamp stalk 4 is thus retained, as in the fifth embodiment. If the safety flash is of type (b) then movement of the headlamp stalk 4 to its first temporary-on position produces a reduced intensity flash (of potentially any duration), and movement of the headlamp stalk 4 to its second temporary-on position produces a full beam flash.

Figure 3:
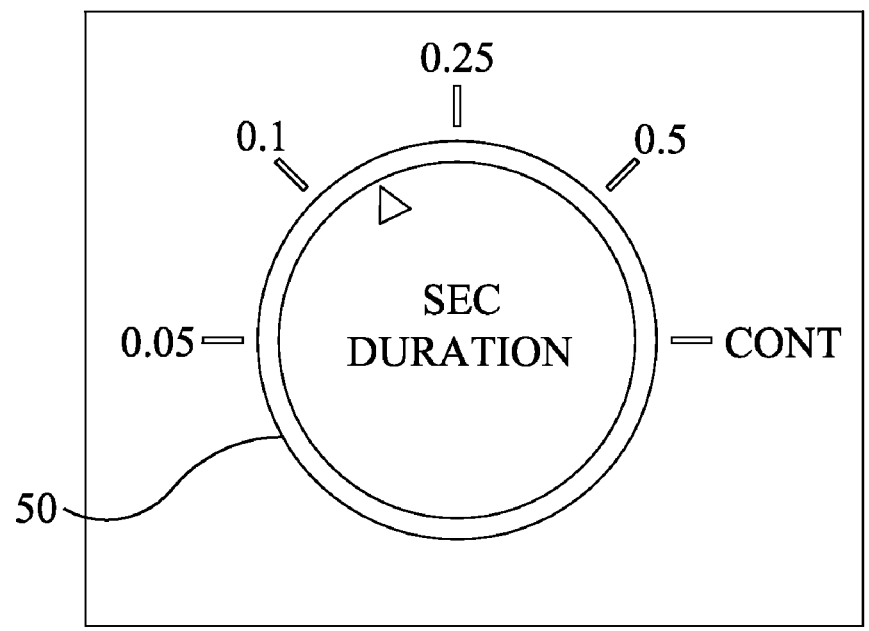
FIG. 3 shows a duration control for use in certain embodiments of the invention.
Figure 4:
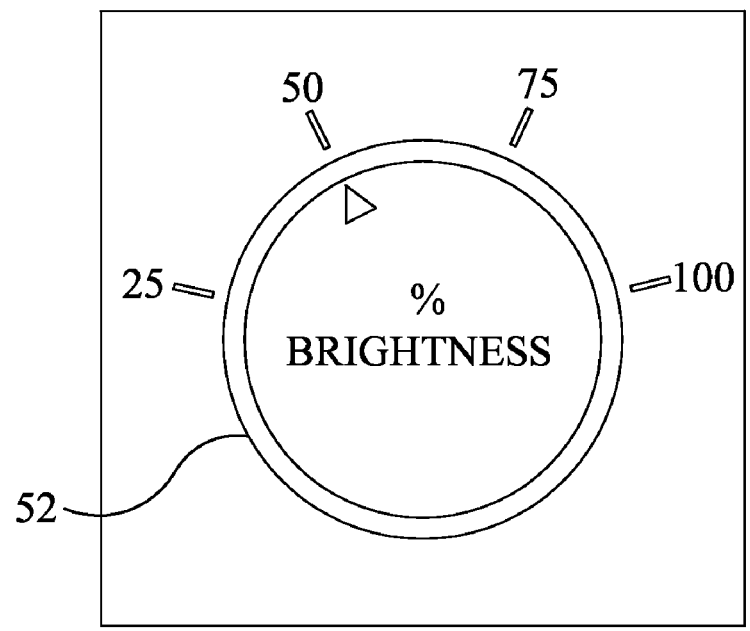
FIG. 4 shows brightness control for use in certain embodiments of the invention.

We next describe the controls of FIGS. 3 and 4, either or both of which can be used as optional extras in any of the embodiments.

FIG. 3 shows a duration control knob 50 which can be used by a driver to set the duration of each safety flash. The knob 50 is rotatably mounted on the dashboard of the vehicle, or in another convenient location, and has 5 settings. The available settings are 0.05 seconds, 0.1 seconds, 0.25 seconds, 0.5 seconds, and "Continuous". Of course many other variations are possible, including longer or shorter times, and including the possibility of having a different number of settings, for example only 0.25 seconds and Continuous, or a smoothly varying range of durations. In the "Continuous" setting the safety flash is no longer of limited duration. For example, in the second and fourth embodiments above the flash would continue for as long as the headlamp stalk was held in its temporary-on position. The flash may or may not be of reduced intensity, and this takes us on to FIG. 4.

FIG. 4 shows a brightness control knob 52 which can be used by a driver to set the brightness of each safety flash. It follows that, in the absence of any adjustment of the control knob 52 between safety flashes, each safety flash has the same, or substantially the same, brightness. If the optional brightness control knob 52 is not included, then successive safety flashes still have the same, or substantially the same, brightness, as there is no means of changing the brightness. The knob 52 is rotatably mounted on the dashboard of the vehicle, or in another convenient location, and has 4 settings in this example. The available settings are 25%, 50%, 75% and 100% of the high beam brightness. Of course many other variations are possible, including different brightnesses, and including different numbers of settings, for example only 50% and 100%, or a smoothly varying range of brightness. In the 100% setting the brightness of a safety flash is the same as a high beam flash. The flash may still be of limited duration. Either or both, or neither, of the two control knobs 50 and 52 may be included in any embodiment.

3. Options after a Safety Flash

As we have seen, each embodiment makes us of a biased actuator, which can be moved from an off position to a temporary-on position to initiate a safety flash. (Examples of such biased actuators are the button 32 in the first embodiment, the headlight stalk 4 or 40 in embodiments two to four, and button 42 in embodiment five.) The following options apply to any of the embodiments.

At the end of a safety flash the headlamps 8 may automatically go back to their previous state, for example low beam mode or off. For a safety flash of type (a) the headlamps 8 may go back to their previous state at the end of the limited duration of the safety flash, even if the biased actuator remains in its temporary-on position for longer than the limited duration of the safety flash. For a safety flash of type (b) (if the safety flash is not also of automatically limited duration) the headlamps 8 may go back to their previous state when the biased actuator is returned from its temporary-on position to its off position.

Any of the embodiments may be modified so that if the biased actuator is held in the temporary-on position for an extended period (which we refer to here as a "high beam period") then at the end of the high beam period the headlights 8 automatically switch to their high beam mode. For a safety flash of type (a) the "high beam period" must be longer than the limited duration of the safety flash. In this case movement of the biased actuator to its temporary-on position would produce a safety flash, and then if the biased actuator was held in its temporary-on position after the safety flash ended the headlamps would automatically switch to high beam after a short delay of for example between 1 and 2 seconds after the safety flash ends.

General Comments on Headlamps

Indicators, intended to indicate turning, are not headlamps, and are not included within the meaning of headlamps in this specification. Indicators are commonly amber or orange in colour, and repeatedly flash in a regularly controlled manner. Headlamps are not amber or orange, and do not repeatedly flash in this manner.

Moreover, indicators use a latched switch to latch the indicators on or off. This differs from the biased actuators described herein, which do not latch in their temporary-on positions.

We note here some standards which may apply to headlamps. There are two different beam pattern and headlamp construction standards in use in the world: The ECE standard, which is allowed or required in virtually all industrialised countries except the United States, and the SAE standard that is mandatory only in the US. The differences between the SAE and ECE (United Nations Economic Commission for Europe) headlamp standards are primarily in the amount of glare permitted towards other drivers on low beam (SAE permits much more glare), the minimum amount of light required to be thrown straight down the road (SAE requires more), and the specific locations within the beam at which minimum and maximum light levels are specified.

According to a report dated 24 Feb. 2006 from the Connecticut General Assembly Office of Legislative Research (available online at the web address http://www.cga.ct.gov/2006/rpt/2006-R-0198.htm) all lighting on motor vehicles in the USA is governed by Federal Motor Vehicle Safety Standard (FMVSS) No. 108. Lights and lighting equipment must be marked with certain designations that show its compliance with the federal standards. (49 CFR §571.108).

The standards do not set a single maximum intensity for all possible types and designs or headlamps because the types of lights and lighting systems designed by manufacturers make a single standard impossible. Rather, FMVSS No. 108 determines the maximum allowable light intensity for a light by its design and the type of lighting system being used. The maximum light output for a particular headlight is determined at a specific point in its aiming pattern.

The federal lighting standard is complex and is difficult to interpret even for some manufacturers and lighting specialists. The actual performance standards are based principally on the standards developed by the Society of Automotive Engineers (SAE). FMVSS No. 108 and the SAE standards apply to all vehicles registered in the United States, regardless of the headlamp filament or light source. Stated simply, the maximum light output of headlamp systems, whether two- or four-light systems, is limited as follows:

1. Type 2 or 2A Lights—Upper beam limited to 20,000 to 75,000 candela per lamp. Lower beam limited to 15,000 to 20,000 candela per lamp.

2. Type 1 or 1A Lights—Upper beam limited to 18,000 to 60,000 candela per lamp.

A candela is the basic unit of measure of luminous intensity in the International System of Units. A candela approximates to the light output of a common candle. A 100-watt light bulb emits about 120 candela.

UNECE Vehicle Regulation 112 (available online at the web address: http://www.unece.org/trans/main/wp29/wp29regs101-120.html) contains the following specification relating to headlamps:

7. Colour 7.1. The colour of the light emitted shall be white. Expressed in CIE trichromatic coordinates, the light of the beams shall be in the following boundaries:

| | |
|---|---|
| limit towards blue | $x \geq 0.310$ |
| limit towards yellow | $x \leq 0.500$ |
| limit towards green | $y \leq 0.150 + 0.640 x$ |
| limit towards green | $y \leq 0.440$ |
| limit towards purple | $y \geq 0.050 + 0.750 x$ |
| limit towards red | $y \geq 0.382$ |

Annex 2

The FIG. 30 indicates that the maximum luminous intensity of the driving beam is between 86250 and 101250 candelas.

These standards identify some of the parameters which may apply to headlamps, and the term "headlamps" as used in this specification includes headlamps having any or all of these characteristics.

The invention claimed is:

1. A headlamp system for a vehicle comprising:
   at least one first headlamp which is switchable between at least a high-intensity beam mode and a low-intensity beam mode;
   a biased actuator movable by a driver of the vehicle between a temporary-ON position and an OFF position, and which is biased from said temporary-ON position to said OFF position; and
   a second headlamp;
   means for energizing the second headlamp to produce at least one flash for a period of time when said biased actuator is moved to said temporary-ON position, said period of time being less than 2 seconds; and
   wherein successive activation of said biased actuator by said driver results, in the absence of any adjustments to said headlamp system between said movements of the biased actuator, in the second headlamp being correspondingly energized with substantially the same intensity.

2. A headlamp system as claimed in claim 1, wherein said at least one flash comprises only a single flash.

3. A headlamp system as claimed in claim 1, further comprising:
   a light sensitive device configured to respond to ambient light level, and
   a control device for controlling, in response to a signal from said light sensitive device, the duration of the flash to be shorter, or the intensity of said flash to be lower, for lower ambient light levels than for higher ambient light levels.

4. A headlamp system as claimed in claim 1, wherein the duration of the safety flash is shorter, or the intensity of said flash is lower, if said at least one first headlamp is in said low-intensity beam mode at the time said biased actuator is moved to said temporary-ON position, than if said at least one first headlamp is OFF at the time said biased actuator is moved to said temporary-ON position.

5. A headlamp system as claimed in claim 1, wherein said biased actuator is a headlamp stalk having an OFF position in which said high-intensity beam is OFF, and a temporary-ON position, and wherein said headlamp stalk is provided with a stalk biasing device which biases said stalk from said temporary-ON position to said OFF position, so that when in said temporary-ON position and released by a driver the stalk automatically returns to said OFF position.

6. A headlamp system as claimed in claim 1, wherein movement of said biased actuator to said temporary-ON position causes said second headlamp to produce at least one flash regardless of whether said at least one first headlamp is already switched ON or OFF.

7. A headlamp system as claimed in claim 1, wherein said first and second headlamps are the same headlamp.

8. A headlamp system as claimed in claim 2, wherein said system further comprises means for adjusting the period of time by a driver.

9. A headlamp system as claimed in claim 1, wherein the period of time is less than any one of: 1.5 seconds, 1 second, 0.5 seconds, 0.25 seconds or 0.1 seconds.

10. A headlamp system as claimed in claim 1, wherein said at least one flash is of lower intensity than said high-intensity beam.

11. A headlamp system as claimed in claim 10, wherein said at least one flash is of higher intensity than said low-intensity beam.

12. A headlamp system as claimed in claim 1, wherein said biased actuator is a headlamp stalk, and wherein said headlamp stalk has first and second temporary-ON positions arranged so that movement of the headlamp stalk to said first temporary-ON position produces said flash, and movement of said headlamp stalk to said second temporary-ON position produces a flash of said high-intensity beam.

13. A headlamp system as claimed in claim 12, wherein a first force applied by a driver to said headlamp stalk is sufficient to move said headlamp stalk to its first temporary-ON position, thus initiating said safety flash, but not sufficient to move said headlamp stalk to its second temporary-ON position, and wherein a second force of greater magnitude than said first force applied by a driver in the same direction as said first force is sufficient to move said headlamp stalk to its second temporary-ON position, thus initiating a high beam flash.

14. A headlamp system as claimed in claim 1 further comprising:
   a headlamp stalk for switching said at least one first headlamp between said high-intensity and low-intensity beam modes;
   wherein said biased actuator is a biased actuator button mounted on said headlamp stalk.

15. A headlamp system as claimed in claim 14, wherein said headlamp stalk has a temporary-ON position in which said at least one first headlamp emits said high-intensity beam for as long as the headlamp stalk remains in its temporary-ON position, and wherein a first force applied by a driver to said biased actuator button is sufficient to move said biased actuator button from its OFF position to its temporary-ON position, thus initiating said safety flash, but not sufficient to move said headlamp stalk to its temporary-ON position, and wherein a second force of greater magnitude than said first force applied by a driver in the same direction as said first force is sufficient to move said headlamp stalk to its temporary-ON position, thus initiating a high-intensity beam flash.

16. A headlamp system as claimed in claim 14, wherein movement of said headlamp stalk to its temporary-ON position immediately initiates a high-intensity beam flash, regardless of the position of said biased actuator button.

* * * * *